(12) United States Patent
Li et al.

(10) Patent No.: US 9,632,341 B2
(45) Date of Patent: Apr. 25, 2017

(54) LIQUID CRYSTAL PANEL FIXING ASSEMBLY AND DISPLAY DEVICE

(71) Applicant: Shenzhen China Star Optoelectronics Technology Co., Ltd., Shenzhen, Guangdong (CN)

(72) Inventors: Quan Li, Guangdong (CN); Yuchun Hsiao, Guangdong (CN); Guofu Tang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 46 days.

(21) Appl. No.: 14/769,809

(22) PCT Filed: Jul. 31, 2015

(86) PCT No.: PCT/CN2015/085808
§ 371 (c)(1),
(2) Date: Aug. 22, 2015

(87) PCT Pub. No.: WO2017/015977
PCT Pub. Date: Feb. 2, 2017

(65) Prior Publication Data
US 2017/0031201 A1     Feb. 2, 2017

(30) Foreign Application Priority Data

Jul. 28, 2015   (CN) .......................... 2015 1 0451753

(51) Int. Cl.
*G02F 1/1333*        (2006.01)
(52) U.S. Cl.
CPC ................. *G02F 1/133308* (2013.01); *G02F 2001/13332* (2013.01); *G02F 2001/133317* (2013.01);
(Continued)

(58) Field of Classification Search
CPC ... G02F 1/133308; G02F 2001/133317; G02F 2001/133322; G02F 2001/13332; G02F 2201/46
See application file for complete search history.

(56) References Cited

U.S. PATENT DOCUMENTS

2011/0025616 A1*   2/2011   Lin ....................... G06F 1/1607
                                                              345/173
2011/0221980 A1*   9/2011   Kawabata ......... G02F 1/133308
                                                              348/794
(Continued)

FOREIGN PATENT DOCUMENTS

| CN | 2727785 Y | 9/2005 |
| CN | 1725075 A | 1/2006 |

(Continued)

OTHER PUBLICATIONS

Lin et al., Frame for fixing display panel, Machine translation of CN 102495481 a from Google Patents website, All Pages.*
Search Report, China Patent Office.

*Primary Examiner* — Dennis Y Kim
(74) *Attorney, Agent, or Firm* — Andrew C. Cheng

(57) ABSTRACT

A liquid crystal panel fixing assembly and a display device are disclosed. The assembly includes a frame structure having a rectangular shape and multiple position-limiting blocks. The frame structure is used for supporting a liquid crystal panel. Two adjacent edges of the frame structure respectively provide with multiple fixing portions having different distances relative to an inner side surface of the frame structure. The multiple position-limiting blocks are selectively fixed at a group of the fixing portions in order to form a placement region for different display panels. Using the frame structure to support the liquid crystal panel, and through adjusting locations of the position-limiting blocks in order to fix liquid crystal panels having different sizes, the (Continued)

cost for developing different backlight modules for different liquid crystal panels is reduced, and the compatibility of a backlight module is increased.

16 Claims, 3 Drawing Sheets

(52) U.S. Cl.
CPC ............ *G02F 2001/133322* (2013.01); *G02F 2201/46* (2013.01)

(56) References Cited

U.S. PATENT DOCUMENTS

| | | | |
|---|---|---|---|
| 2013/0044516 A1* | 2/2013 | Yu | G02B 6/0088 362/612 |
| 2013/0155717 A1* | 6/2013 | Jeong | G02F 1/133308 362/602 |
| 2013/0193092 A1 | 8/2013 | Stifal | |
| 2014/0153222 A1* | 6/2014 | Lee | F21V 21/14 362/97.1 |
| 2015/0177453 A1* | 6/2015 | Ikuta | G02B 6/0073 348/794 |

FOREIGN PATENT DOCUMENTS

| | | |
|---|---|---|
| CN | 101989110 A | 3/2011 |
| CN | 102495481 A | 6/2012 |
| CN | 102522050 A | 6/2012 |

* cited by examiner

LIQUID CRYSTAL PANEL FIXING ASSEMBLY AND DISPLAY DEVICE

BACKGROUND OF THE INVENTION

1. Field of the Invention

The present invention relates to a display technology field, and more particular to a liquid crystal panel fixing assembly and a display device.

2. Description of Related Art

In the development of a liquid crystal panel, because of the consideration for the need of difference, panels having a same display size may have different external sizes. Specially, different panel manufacturers utilize different trace technology, and external sizes of panels are more different. In the development of a backlight module, in order to reduce a development process of a mold, reduce development cost, shorten development period, a backlight module that can be compatible with liquid crystal panels having different external sizes is required. However, the conventional fixing method cannot satisfy the above requirement.

SUMMARY OF THE INVENTION

In view of the deficiencies of the conventional art, the present invention provides a liquid crystal panel fixing assembly and a display device which can make a backlight be compatible with different liquid crystal panels in sizes.

In order to achieve above purpose, the present invention adopts the following technology solution: a liquid crystal panel fixing assembly, comprising: a frame structure having a rectangular shape; and multiple position-limiting blocks; wherein, the frame structure is used for supporting a liquid crystal panel; two adjacent edges of the frame structure respectively provide with multiple fixing portions having different distances relative to an inner side surface of the frame structure; the multiple position-limiting blocks are selectively fixed at a group of the fixing portions in order to form an placement region for different display panels.

Wherein, one of the multiple fixing portions includes two spaced insertion holes; a surface of a position-limiting block is provided with two spaced protrusion columns; the protrusion columns are respectively inserted into the two insertion holes.

Wherein, the liquid crystal panel fixing assembly further includes a fastening part; one of the multiple fixing portions includes two spaced insertion holes; a surface of a position-limiting block is provided with a protrusion column and a through hole which are disposed at an interval; the protrusion column is inserted into one insertion hole; the fastening part passes through the through hole and inserts into the other insertion hole.

Wherein, the liquid crystal panel fixing assembly further includes two fastening parts; one of the fixing portions includes two spaced insertion holes; a surface of a position-limiting block is provided with two through holes which are disposed at an interval; the two fastening parts respectively pass through the two through holes and insert into the two insertion holes.

Wherein, the fixing portions are disposed at intervals along a length direction of an edge where the fixing portions are located.

Wherein, the frame structure is a horizontal portion of a middle frame.

Wherein, the liquid crystal panel fixing assembly further includes a front frame, and the front frame presses the liquid crystal panel on the frame structure.

Wherein, a top surface of the frame structure is provided with a position-limiting column which is protruded out from the top surface; the front frame is provided with a position-limiting hole; the position-limiting column is disposed in the position-limiting hole.

Wherein, after a position-limiting block is rotated 180 degrees and is fixed at a same fixing portion again, a size of a placement region of a liquid crystal panel enclosed by the multiple position-limiting blocks is changed.

Another purpose of the present invention provides a display device, comprising a liquid crystal panel and the above liquid crystal panel fixing assembly, wherein, a bottom surface of the liquid crystal panel is disposed on the frame structure, and side walls of the liquid crystal panel are clamped and limited by the multiple position-limiting blocks.

In the present invention, through designing a liquid crystal panel fixing assembly and using the frame structure to support the liquid crystal panel. At each edge of the frame structure. A location adjustable position-limiting block is provided. Through changing the location of the position-limiting block at each edge of the frame structure, fixing liquid crystal panels having different sizes is convenient to achieve. The cost for developing different backlight modules for different liquid crystal panels is reduced, and the compatibility of a backlight module is increased.

DETAILED DESCRIPTION OF THE PREFERRED EMBODIMENT

The following content combines figures and embodiments for detail description of the present invention.

Embodiment 1

Figure 1:
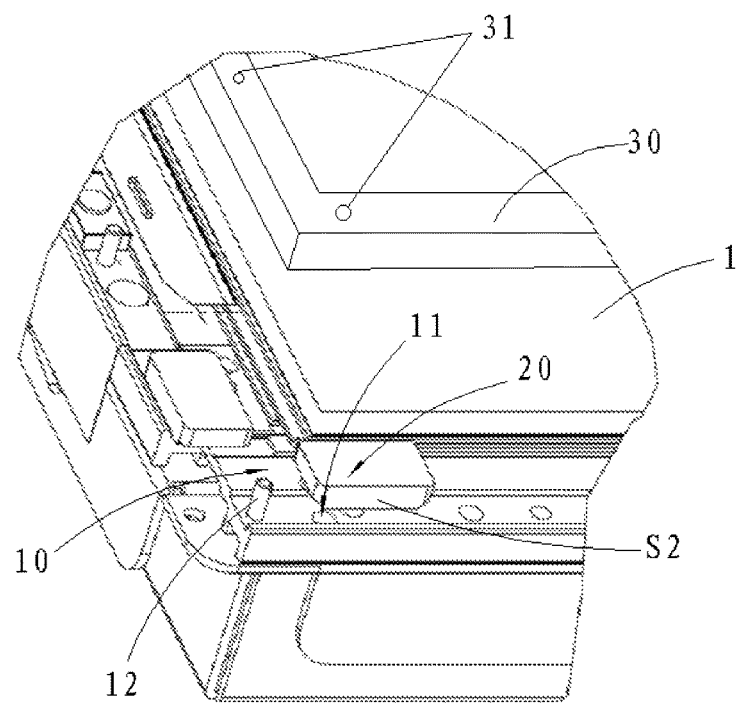
FIG. 1 is a schematic diagram of a display device according to a first embodiment of the present invention.

With reference to FIG. 1, a liquid crystal panel fixing assembly is used for limiting and fixing a liquid crystal panel 1 of a display device. The liquid crystal panel fixing assembly includes a frame structure 10 having a rectangular shape, and multiple position-limiting blocks 20 disposed on the frame structure 10. The frame structure 10 is used for supporting the liquid crystal panel 1. Two adjacent edges of the frame structure 10 respectively provide with multiple fixing portions 11 having different distances relative to an inner side surface of the frame structure 10. The position-limiting blocks 20 are selectively fixed at a group of the fixing portions 11. The position-limiting blocks 20 are disposed at intervals in order to form a placement region for different display panels. A bottom surface of the display panel 1 is disposed on the frame structure 10, and side walls of the liquid crystal panel 1 are clamped and limited by the position-limiting blocks 20. The frame structure 10 is a horizontal portion of a middle frame of the display device.

Figure 2:
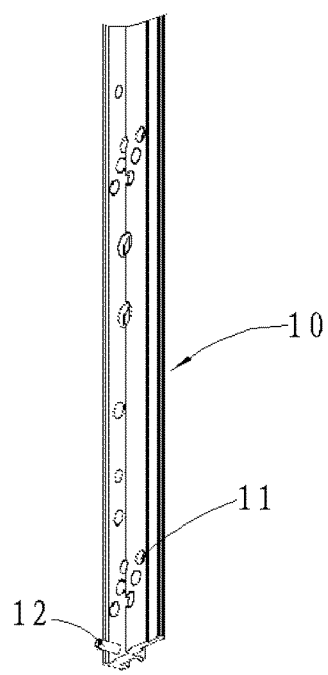
FIG. 2 is a schematic stereoscopic diagram of a frame structure according to a first embodiment of the present invention.
Figure 3:
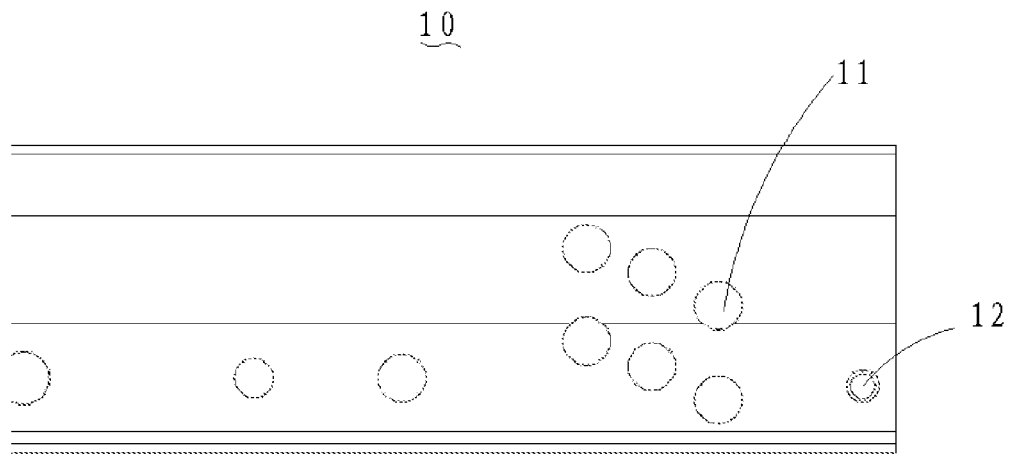
FIG. 3 is a schematic plain view of a frame structure according to a first embodiment of the present invention.

With combined reference to FIG. 2 and FIG. 3, on the frame structure 10, the fixing portions 11 located at a same side are disposed at intervals along a length direction of an edge where the fixing portions 11 are located. Distances of two adjacent fixing portions with respect to an inner side surface of the frame structure 10 are different. Therefore, through selectively fixing the position-limiting blocks 20 to corresponding fixing portions 11 in order to change a size of a rectangular region enclosed by the inner walls of the multiple position-limiting blocks 20.

Figure 4A:
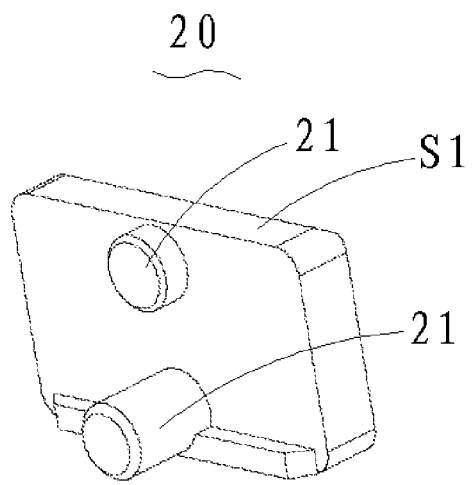
FIG. 4a is a schematic diagram of a position-limiting block according to a first embodiment of the present invention.

As a direction shown in FIG. 3, each of the fixing portions 11 of the present embodiment is two adjacent insertion holes disposed at intervals. Distances between two insertion holes of the fixing portions 11 are the same. At a same side of the frame structure 10, closer to a corner of the frame structure 10, a distance between a fixing portion 11 and a middle portion of the frame structure 10 is larger such that in a process for adjusting locations of the position-limiting blocks 20, a rectangular region enclosed by the position-limiting blocks 20 is larger when the position-limiting blocks 20 are moving more closely to the corner of the frame structure 10. When a rectangular region enclosed by the position-limiting blocks 20 is larger, a size of a liquid crystal display panel which can be clamped is larger. In FIG. 4a, a bottom surface of each position-limiting block 20 is provided with two spaced protrusion columns 21. The protrusion columns 21 are inserted into a fixing portion 11 through an interference fitting method in order to achieve a relative fixing between the position-limiting blocks 20 and the frame structure 10.

Figure 4B:
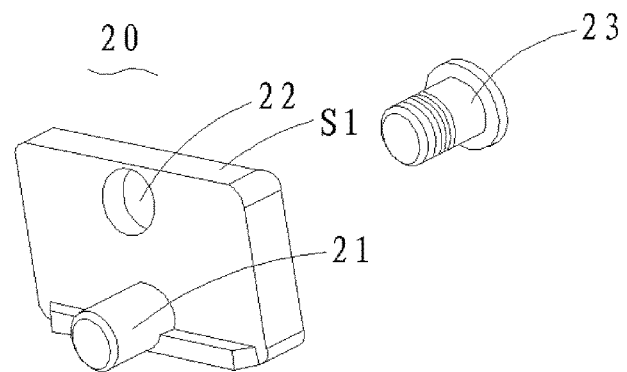
FIG. 4b is a schematic diagram of another position-limiting block according to a first embodiment of the present invention.

FIG. 4b is another structure of the position-limiting block 20 of the present invention. A protrusion column 21 and a through hole 22 are disposed at intervals on a bottom surface of the position-limiting block 20. The protrusion column 21 is inserted into the fixing portion 11, and after a fastening part 23 passes through the through hole 22, the fastening part 23 is also inserted into the fixing part 11 in order to complete a fixing.

Figure 4C:
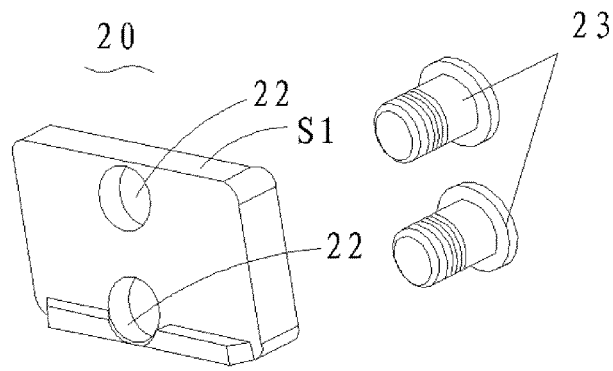
FIG. 4c is a schematic diagram of another position-limiting block according to a first embodiment of the present invention.

FIG. 4c is another structure of a position-limiting block 20 of the present invention. Two through holes 22 are disposed at an interval on the position-limiting block 20, after the fastening part 23 passes through the through holes 22, the fastening part 23 is inserted into the fixing portions 11.

In addition, a front frame 30 is disposed at an outer surface of the display device for protecting structures inside the display device. The front frame 30 presses the liquid crystal panel 1 on the frame structure 10. A top surface of the frame structure 10 is provided with a position-limiting column 12 which is protruded out from the top surface. Correspondingly, the front frame 30 is provided with a position-limiting hole 31. The position-limiting column 12 passes through and disposes in the position-limiting hole 31 in order to further limit the frame structure 10 so as to increase a fixing reliability of the liquid crystal panel 1.

Embodiment 2

Figure 5:
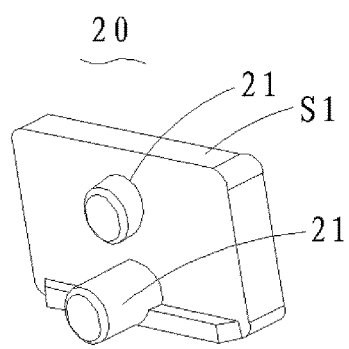
FIG. 5 is a schematic diagram of a position-limiting block according to a second embodiment of the present invention.

With combined reference to FIG. 5, in addition, distances of two protrusion columns 21 with respect to an inner side wall S1 and an outer side wall S2 (shown in FIG. 1) of the position-limiting block 20 are not equal. That is, a distance between the protrusion column 21 located at an inner side and the inner side wall S1 is not equal to a distance between the protrusion column 21 at an outer side and the outer side wall S2. Through above arrangement, when a position-limiting block 20 is pulled out, rotated 180 degrees (i.e. positions of the outer side wall S2 and the inner side wall S1 are exchanged) and fixed into a same fixing portion 11, a distance between the position-limiting blocks 20 located on two opposite side walls of the frame structure 10 is changed so that a size of a placement region of a liquid crystal panel enclosed by multiple position-limiting blocks 20 is changed. Accordingly, a size range of the liquid crystal panels that is compatible with the same liquid crystal fixing assembly is extended. It can be understood that the other two kinds of the position-limiting blocks shown in FIG. 4b and FIG. 4c of the first embodiment can be changed correspondingly such that after positions of the outer side wall S2 and the inner side wall S1 are exchanged, a size of a rectangular region enclosed by the position-limiting blocks 20 is changed.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A liquid crystal panel fixing assembly, comprising:
   a frame structure having a rectangular shape; and
   multiple position-limiting blocks;
   wherein, the frame structure is used for supporting a liquid crystal panel; two adjacent edges of the frame structure are respectively provided with multiple fixing portions having different distances relative to an inner side surface of the frame structure; the multiple position-limiting blocks are selectively fixed at a group of the fixing portions in order to form a placement region for different display panels; and
   wherein, after a position-limiting block is rotated 180 degrees and is fixed at a same fixing portion again, a size of a placement region of a liquid crystal panel enclosed by the multiple position-limiting blocks is changed.

2. The liquid crystal panel fixing assembly according to claim 1, wherein, one of the multiple fixing portions includes two spaced insertion holes; a surface of a position-limiting block is provided with two spaced protrusion columns; the protrusion columns are respectively inserted into the two insertion holes.

3. The liquid crystal panel fixing assembly according to claim 1, wherein, the liquid crystal panel fixing assembly further includes a fastening part; one of the multiple fixing portions includes two spaced insertion holes; a surface of a position-limiting block is provided with a protrusion column and a through hole which are disposed at an interval; the protrusion column is inserted into one insertion hole; the fastening part passes through the through hole and inserts into the other insertion hole.

4. The liquid crystal panel fixing assembly according to claim 1, wherein, the liquid crystal panel fixing assembly further includes two fastening parts; one of the fixing portions includes two spaced insertion holes; a surface of a position-limiting block is provided with two through holes which are disposed at an interval; the two fastening parts respectively pass through the two through holes and insert into the two insertion holes.

5. The liquid crystal panel fixing assembly according to claim 1, wherein, the fixing portions are disposed at intervals along a length direction of an edge where the fixing portions are located.

6. The liquid crystal panel fixing assembly according to claim 1, wherein, the frame structure is a horizontal portion of a middle frame.

7. The liquid crystal panel fixing assembly according to claim 1, wherein, the liquid crystal panel fixing assembly further includes a front frame, and the front frame presses the liquid crystal panel on the frame structure.

8. The liquid crystal panel fixing assembly according to claim 7, wherein, a top surface of the frame structure is provided with a position-limiting column which is protruded out from the top surface; the front frame is provided with a position-limiting hole; the position-limiting column is disposed in the position-limiting hole.

9. A display device, comprising:
a liquid crystal panel; and
a liquid crystal panel fixing assembly, including:
a frame structure having a rectangular shape; and
multiple position-limiting blocks;
wherein, the frame structure is used for supporting a liquid crystal panel; two adjacent edges of the frame structure are respectively provided with multiple fixing portions having different distances relative to an inner side surface of the frame structure; the multiple position-limiting blocks are selectively fixed at a group of the fixing portions in order to form a placement region for different display panels;
wherein, a bottom surface of the liquid crystal panel is disposed on the frame structure, and side walls of the liquid crystal panel are clamped and limited by the multiple position-limiting blocks; and
wherein, after a position-limiting block is rotated 180 degrees and is fixed at a same fixing portion again, a size of a placement region of a liquid crystal panel enclosed by the multiple position-limiting blocks is changed.

10. The display device according to claim 9, wherein, one of the multiple fixing portions includes two spaced insertion holes; a surface of a position-limiting block is provided with two spaced protrusion columns; the protrusion columns are respectively inserted into the two insertion holes.

11. The display device according to claim 9, wherein, the liquid crystal panel fixing assembly further includes a fastening part; one of the multiple fixing portions includes two spaced insertion holes; a surface of a position-limiting block is provided with a protrusion column and a through hole which are disposed at an interval; the protrusion column is inserted into one insertion hole; the fastening part passes through the through hole and inserts into the other insertion hole.

12. The display device according to claim 9, wherein, the liquid crystal panel fixing assembly further includes two fastening parts; one of the fixing portions includes two spaced insertion holes; a surface of a position-limiting block is provided with two through holes which are disposed at an interval; the two fastening parts respectively pass through the two through holes and insert into the two insertion holes.

13. The display device according to claim 9, wherein, the frame structure is a horizontal portion of a middle frame.

14. The display device according to claim 13, wherein, the liquid crystal panel fixing assembly further includes a front frame, and the front frame presses the liquid crystal panel on the frame structure.

15. The display device according to claim 14, wherein, a top surface of the frame structure is provided with a position-limiting column which is protruded out from the top surface; the front frame is provided with a position-limiting hole; the position-limiting column is disposed in the position-limiting hole.

16. A display device, comprising:
a liquid crystal panel; and
a liquid crystal panel fixing assembly, including:
a horizontal portion of a middle frame; and
multiple position-limiting blocks;
wherein, the horizontal portion of the middle frame is used for supporting a liquid crystal panel; two adjacent edges of the horizontal portion of the middle frame are respectively provided with multiple fixing portions having different distances relative to an inner side surface of the horizontal portion of the middle frame; the multiple position-limiting blocks are selectively fixed at a group of the fixing portions in order to form a placement region for different display panels;
wherein, a bottom surface of the liquid crystal panel is disposed on the horizontal portion of the middle frame, and side walls of the liquid crystal panel are clamped and limited by the multiple position-limiting blocks; and
wherein, after a position-limiting block is rotated 180 degrees and is fixed at a same fixing portion again, a size of a placement region of a liquid crystal panel enclosed by the multiple position-limiting blocks is changed.

* * * * *